(12) United States Patent
Laker et al.

(10) Patent No.: US 6,427,908 B1
(45) Date of Patent: Aug. 6, 2002

(54) GABLE TOP CONTAINER WITH PULL TAB

(75) Inventors: Jonathan Paul Laker; Kirk Anthony Laker, both of Felixstowe (GB)

(73) Assignee: Easycarton Limited, London (GB)

( * ) Notice: Subject to any disclaimer, the term of this patent is extended or adjusted under 35 U.S.C. 154(b) by 0 days.

(21) Appl. No.: 09/530,144

(22) PCT Filed: Oct. 29, 1998

(86) PCT No.: PCT/GB98/03226

§ 371 (c)(1),
(2), (4) Date: Jun. 19, 2000

(87) PCT Pub. No.: WO99/21766

PCT Pub. Date: May 6, 1999

(30) Foreign Application Priority Data

Oct. 29, 1997 (GB) ............................................... 9722795
May 8, 1998 (GB) ............................................... 9809805

(51) Int. Cl.⁷ ................................................. B65D 5/74
(52) U.S. Cl. ................................ 229/160.2; 229/125.42
(58) Field of Search ........................... 229/125.42, 137, 229/160.2, 213, 214, 215, 249

(56) References Cited

U.S. PATENT DOCUMENTS

| | | | |
|---|---|---|---|
| 2,470,199 A | 5/1949 | Vivian | |
| 2,687,840 A | 8/1954 | Innes | |
| 3,204,850 A | 9/1965 | Wilcox | |
| 3,520,464 A | 7/1970 | Pugh, Sr. | |
| 4,821,950 A | 4/1989 | Sanchez et al. | 229/160.2 |
| 4,874,126 A | 10/1989 | Miller | 229/160.2 |
| 4,883,222 A | * 11/1989 | Fujisawa | 229/249 |
| 5,871,146 A | * 2/1999 | Onderko et al. | 229/160.2 |
| 6,142,364 A | * 11/2000 | Laker et al. | 229/125.42 |

FOREIGN PATENT DOCUMENTS

| | | | | |
|---|---|---|---|---|
| DE | 2650092 A | * | 5/1978 | 229/214 |
| EP | 87839 A | * | 9/1983 | 229/214 |
| GB | 2253608 A | * | 9/1992 | |
| JP | 6-24438 A | * | 2/1994 | 229/160.2 |
| WO | WO-82/03370 A1 | * | 10/1982 | 229/160.2 |
| WO | WO-94/25352 A2 | * | 11/1994 | 229/125.42 |
| WO | WO-96/29253 A1 | * | 9/1996 | |

* cited by examiner

Primary Examiner—Gary E. Elkins
(74) Attorney, Agent, or Firm—Bracewell & Patterson, LLP

(57) ABSTRACT

A boxed end container is shown having one end closed by a transverse ridge seal and carrying a pull tab. The pull tab allows a separating force to be applied to the ridge seal of the sealed container to separate at least part of the ridge seal and thus open the container and allow discharge of its contents. The pull tab is a generally planar member having an axially extending shank member with a proximal end portion which can be gripped and pulled by a user and a distal end portion having foot members extending transversely to each side of thereof. The shank and foot members are substantially co-planar with one another. The pull tab is secured by the foot members externally to a wall of the container at or adjacent to the ridge seal of the container.

20 Claims, 5 Drawing Sheets

GABLE TOP CONTAINER WITH PULL TAB

BACKGROUND TO THE INVENTION

Many materials, notably fluids such as milk or fruit juices, liquid detergents or fabric softeners and mineral or vegetable oils, and powders such as detergent powders (for convenience collectively denoted hereinafter as fluids), are put up in sealed containers for transport and storage prior to use, when the container is opened and the contents discharged. Many forms of containers are used for this purpose, but one form is a thin walled carton made from a thin card or plastic sheet material and having a generally squared or rectangular cross-section and a cuboid or brick-like overall shape. The contents of such a container are typically fed to the container through an open top end of the container, the other end being having been closed by folding over the basal portion of the side walls to form a boxed end to the container. When the desired amount of material has been fed to the container, the open top of the container is closed by forming transversely directed V folds in the upper portions of two opposed side walls, with the apexes of the Vs directed inwardly towards one another. This has the effect of bringing the top portions of the other two side walls of the container together to form a tented top to the container having a ridge lying along the line of indentation of the V folds. The ridge is then heat sealed or otherwise processed so as to secure together the opposed faces of the upper portions of the V folded and other side walls in a single linear transverse strip seal closure to the container, at least the major portion of the closure being located within the overall cross-sectional plan area of the container.

The sealed ridge is often then folded down about a transverse fold line extending across approximately the midpoint of one of the side walls of the tented top, so as to form a flat boxed end to the container. In some forms of such a closure, a tape, which can be wire-reinforced, is included in the line of the ridge, for example during folding over of the ridge material. This tape extends beyond the ends of the ridge to provide extensions which can be bent over to secure the folded down ridge in position by engaging the free ends of the tape under the lip formed along the edge of the boxed end where the V folded portion of the container wall is indented. Alternatively, the free ends of the extensions can be adhered or otherwise secured to the side walls of the container once the ridge has been folded down, to form a boxed end to the container.

For convenience, the following terms will have the following means herein:

boxed end openable containers are containers of the above described general type;

ridge seal will be used to denote the transverse linear seal between the opposed faces of the top end portions of the indented and non-indented side walls of the container;

ridge will be used to denote the exposed top edge of the ridge seal or the edges of the wall material which have been brought together prior to forming the ridge seal;

ridge structure will be used to denote the structure formed by bringing together the top end portions of the side walls of the container and which have been or are to be secured together by heat sealing, welding, adhesion or other means between opposing faces at the interfaces between those opposing faces to form the ridge seal;

gabled end will be used to denote the structure formed at the top end of the container by indenting the upper portions of two opposed side walls of the container to form the V folds in the ridge structure;

tented end will be used to denote the end of the container with the ridge in the raised position either before or after forming the ridge seal;

gabled side walls will be used to denote the upper portions, usually three triangular portions, of the two opposed side walls of the open end of the container which have been indented by forming a V or other axial fold in the upper portion of the side wall so that the wall is collapsed laterally inwardly to form the gabled end to the container;

gable end triangles will be used to denote the triangular shaped walls forming the exposed surfaces within the gabled end of the container;

tent side walls will be used to denote the two opposed side walls of the container which extend between the gabled side walls of the gabled end of the container;

wet wall will be used to denote an internal surface of the container which is to be in contact with the contents of the container, including the upper portions of such walls which are to be incorporated into the ridge structure;

dry wall will be used herein to denote an external surface of the container which is not in contact with the contents of the container, including the upper portions of such walls which are to be incorporated into the ridge structure.

To open such a boxed end openable container, the seal in the gabled end at the interface between the opposing dry wall surfaces of the V fold at one end of the linear ridge seal is separated. This forms a pair of wings in the gabled end so that the plan view configuration from above of the ridge seal to the container adopts a Y shaped configuration in place of a single line seal. The top edges of the wings forming the head of the Y remain sealed together so that the container is still sealed when the ridge seal adopts this configuration. The wings are then bent backward to lie in line with each other, ie. so that the plan view configuration from above of the ridge seal adopts a T shaped configuration with the wings forming the head of the T. The free ends of the wings are then pressed inwardly towards the centre line of the upright of the T to apply a separating force to the seal at the intersection of the head and the upright of the T. This is intended to cause the seal between the opposed faces of the wet walls at the top of the container to separate at this intersection and to form an opening through which the contents of the container can be discharged. In some cases it may be desired to bend the wings beyond the in-line configuration to form a Y plan shape having an inverted head (the inverted Y configuration), so as to enhance the separating force applied to the seal at the intersection upon the application of pressure to the free ends of the wings.

However, separation of the seal at the intersection is often incomplete and/or the wings collapse so that the user cannot continue to apply the separating force to the seal. It is therefore usually necessary for the user to insert a finger tip, knife point or other implement into the initial opening formed at the intersection to assist full separation of the seal to be achieved and the opening then extended to form a spout outlet to the container.

In many cases the initial separation of the seal between the wet walls at the intersection of the head and upright of the T is insufficient to form an aperture into which the user can insert a finger tip. It is then necessary for the user to pinch the dry wall material in the region of the intersection and to try to pull the wall outwardly to cause separation of the seal at the intersection. Such separation of the seal may occur abruptly, causing spillage of the contents of the container, and the need for such additional operations to separate the ridge seal is inconvenient.

Notwithstanding these problems in forming the opening to the container, which are particularly acute for the aged or infirm and for children, boxed end openable containers provide a simple and effective container for the storage and transport of a wide range of fluids and remain widely used.

Many attempts have been made to resolve the difficulties in opening such containers by incorporating string pulls or the like into the linear seal at the gabled end of the container, see for example U.S. Pat. Nos 4,883,222, 4,821,950 and 4,874,126, European Application No. 0 695 264A and British Patent Application No 2,010,212A. However, in all cases one or more additional components have to be incorporated into the ridge structure. This introduces problems in accurate positioning of this component and securing it in position. It also introduces an additional member between the walls which are to be sealed together to form the ridge seal, which may result in weakening of the seal in this area, with the attendant risk of premature failure of the ridge seal. In addition, the material from which the additional component is formed often undergoes thermal fusion when the ridge seal is formed by a heat sealing process. This can cause the additional component to fuse together and/or to exposed wall surfaces of the container, causing the component to snap when pulled and/or to create additional sealing adjacent the ridge seal which has to be separated in order to open the container. The additional component is often secured in register with what is to become the pouring spout to the opened container. The contents of the container then flow over the component which may have been exposed to dirt, grease or other materials and thus cause contamination of the contents. Furthermore, in order to introduce the additional components into the ridge seal it is necessary to modify the carton construction, filling and sealing processes considerably, which adds to the capital and operating costs required to implement such proposals. None of these proposals has been adopted commercially.

It has also been proposed in for example U.S. Pat. No. 3,520,464, PCT Applications Nos. WO96/29253 and WO97/44255 and British Patent Application No. 2,253,608A to secure a pull tab or the like to one or more of the gable end triangular wall sufaces of the gabled end of the container. Whilst such a proposal may overcome the problems in securing an additional component within the ridge structure, such proposals have not been adopted. This is due to failure of the anchorage of the pull tab to the wall of the container when tension is applied to it to open the container, even where the ridge seal is partially separated to adopt the T plan configuration as described above. As a result, the pull tab separates from the container before the ridge seal is separated and the container remains sealed. Even if the area of the foot of the pull tab which is anchored to the wall of the container is increased, the maximum area which can be achieved is restricted by the available area of the triangular wall(s) to which the foot is attached and the maximum size of the pull tab which can be accepted before it interferes with the mechanical handling of the carton during filling and transport, and removal of the pull tab before the ridge seal separates still occurs.

In place of additional components to provide the pull tab, it has been proposed, for example in European Patent Application No. 0 087 839A and PCT Application No. WO82/03370, to provide the pull tabs as axial extensions of part of the walls of the container. However, such extensions are usually located at what will be the pouring spout of the opened container, which results in contamination of the contents as pointed out above. Furthermore, if such axial extensions are folded to lie flat against the outside wall of the container, so as to avoid their becoming snagged in the container forming or filling machinery, at least part of the extension will be incorporated into the ridge structure and will become fused within the ridge seal as the container is sealed. This can so weaken the pull tab that it breaks away from the ridge seal and/or the tab becomes fused within the ridge seal. This can lead to additional seals which require separation in order to open the container.

It has also been proposed to weaken the adhesive bond within the ridge seal so that less force is required to separate the seal and thus open the container. For example, it has been proposed to apply an abhesive to parts of the wet walls within the ridge structure so that they do not, or only weakly, adhere to one another during the container sealing operation. However, the use of abhesives requires accurate placement of the correct amount of the abhesive at the desired locations within the ridge structure so that only a very weak seal is formed within the gabled end. This introduces additional operations and costs in the manufacture of the sealed container and inherently carries the attendant risk that the seal will fail prematurely during storage, transport or handling by the end user. In order to reduce this risk, it has been proposed in U.S. Pat. No. 4,946,041 to use a specially sculptured heat sealing bar to omit sealing of areas within the ridge seal itself. However, this requires the use of complex additional heat seals and accurate formation of the non-sealed areas and also carries the inherent risk of premature failure of the ridge seal.

It has also been proposed, for example in U.S. Pat. No. 3,204,850 and GB Patent No. 689,204, not to form a ridge seal by bonding together opposing faces within the ridge structure, but to form a labyrinthine mechanical seal by folding over the ridge structure and securing the folded structure in position by a wire or adhesive. Such proposals are susceptible to leakage of the container since no bonded seal is formed. Furthermore, such proposals require the use of specialist folding equipment and cannot be carried out on conventional container manufacturing equipment.

Rather than weaken the ridge seal or introduce additional components into the ridge structure, it has been proposed to form lines of weakness or actual cuts through the container wall and to cover those with a removable cover strip, see for example GB Application No. 2,253,608A and U.S. Pat. Nos. 3,456,328 and 2,687,840. Removal of the cover strip exposes the cut or line of weakness which can then be separated to form an opening to the container. In a variation of such proposals, the wall of the container is partially cut through so that the wall can be torn at this point to form an outlet spout without the need to separate the ridge seal or to form a pull tab from the wall of the container which can then be used to separate the ridge seal, see for example U.S. Pat. Nos. 2,470,199, 5,067,613 and 5,516,037. Such deliberate weakening of the container wall carries the inherent risk of premature failure of the container.

However, none of the above proposals has proved technically or commercially viable and, as a result, no satisfactory method for opening the gabled end of a boxed end container exists in commerce. Despite the known and much publicised problems with opening a boxed end container, such containers continue to be widely used because of their simplicity, low cost and ease of production and general acceptance by the public.

Surprisingly, we have found that if the foot of a pull tab secured to a wall of the container is secured in a specific manner, the problems due to separation of the pull tab from the container wall before the separation of the ridge seal occurs can be reduced.

SUMMARY OF THE INVENTION

Accordingly, the present invention provides a boxed end container having one end closed by a transverse ridge seal and carrying a pull tab whereby a separating force can be applied to the ridge seal of the sealed container so as to separate at least part of the ridge seal and thus open the container and allow discharge of its contents, which pull tab comprises a generally planar member having an axially extending shank member with a proximal end portion adapted to be gripped and pulled by a user and a distal end portion having foot members extending transversely to each side of thereof, the shank and foot members being substantially co-planar with one another, the pull tab being secured by the foot members externally to a wall of the container at or adjacent to the ridge seal of the container, characterised in that:

- a the foot members are secured substantially symmetrically about the longitudinal axis of the shank member to a wall of the container and/or to that portion of a wall incorporated into the ridge seal; and
- b. the pull tab has a point of rotation about which the shank member flexes with respect to the foot members when tension is applied to the proximal end of the shank member during opening of the container, which point of rotation is located longitudinally with respect to the shank member substantially in register with the junction of the shank member and the proximal edges of the foot members; and
- c. the securement of each of the foot members to the container wall is by means of a securement means which presents an edge proximal to the point of rotation which edge is configured so that at least a portion thereof extends normal to a line extending from said proximal edge to said point of rotation, said line intersecting said edge intermediate the ends thereof.

The term edge is used herein with respect to the securement means to denote the periphery of the securement means extending in the plane of the wall of the container.

Preferably, the securement is by means of a heat seal between the surface layers of the container wall and the material of the pull tab. Surprisingly, we have found that such heat seals can be in the form of line seals rather than seals extending over the full plan areas of the opposed faces of the container wall and the foot members of the pull tab. It is most unexpected that reducing the area over which the foot member is secured to the container wall does not weaken the securement of the pull tab to the container.

Accordingly, the present invention also provides a boxed end container having a pull tab secured externally to a wall of the container at or adjacent to the ridge structure of the container whereby a separating force can be applied to the ridge seal of the sealed container, characterised in that the distal end of the pull tab is secured externally to an external wall of the container and in that securement of the distal end is by means of at least two lines of securement, one to each side of the longitudinal axis of the shank of the pull tab, each of which lines of securement have at least a portion thereof which is configured so that it extends normal to a line extending from the point of rotation of the shank of the pull tab and intersecting the line of securement intermediate the ends thereof. We believe that such a configuration ensures that the portion of the line of securement most closely adjacent to the point of rotation of the shank member is orientated substantially at right angles to the forces transmitted from the shank member to the foot members and thus acts as a stop to any peeling separation of the securement from the container wall.

In a particularly preferred embodiment, the foot members are secured to the container wall so that the securement area for each foot extends longitudinally both above and below the point of rotation of the shank of the pull tab. We have found that such a form of securement reduces the risk that the securement undergoes progressive peel separation as the proximal end of the pull tab is lifted away from the plane of the container wall and tension applied thereto.

Accordingly, the present invention also provides a boxed end container of the invention, characterised in that the distal end of the pull tab is secured to a wall of the container by means of a securement area or areas, at least one lying to each side of the longitudinal axis of the shank of the pull tab, the securement areas extending longitudinally to each side of the point of rotation of the shank of the pull tab. Preferably, the securement areas extend a distance d above (distally beyond) the point of rotation and a distance d' below (proximally short of) the point of rotation and the ratio of d:d' has a value of from 10:1 to 1:10, preferably about 1:3 to 3:1, notably about 1:1.

We believe that a pull tab having the configuration required to achieve such a form of securement to the container wall is novel. The invention therefore also provides a pull tab for use upon a container, which pull tab comprises a generally planar member having a proximal portion adapted to be gripped and pulled by a user, a longitudinally extending shank member and a distal portion by which the pull tab can be secured to a wall of a container or a blank for use in the manufacture of a container, characterised in that the distal portion is provided with two foot members extending laterally to each side of the longitudinal axis of the shank member, each foot member extending proximally and distally longitudinally to either side of the point of rotation of the shank member We have further found that the provision of an area between the foot members which is not secured to the wall of the container can be advantageous in that it allows the shank and the junction between the shank and the foot members to lift off the surface of the walls as the V folds are formed therein during the sealing of the container. This reduces the severity of the folding which the pull tab has to undergo and minimises the formation of a set in the material of the pull tab which could affect the way in which the pull applied to the proximal end of the pull tab is transferred to the foot members. The lack of securement between the foot members also allows to foot members to move laterally towards each other as pull is applied to the proximal end of the pull tab. This causes the foot members to apply two opposing forces acting along the line of the ridge so as to develop a rolling peeling separation of the ridge seal. The application of such a peeling force more readily achieves separation of the ridge seal than a shear force.

Accordingly, the present invention also provides a boxed end container having a pull tab secured externally to a wall of the container at or adjacent to the ridge structure whereby a separating force can be applied to the ridge seal of the sealed container, characterised in that the distal end of the pull tab is secured to an external wall of the container and in that securement of the distal end is by means of two laterally spaced apart portions of the distal end portion of the pull tab with an intermediate unsecured portion located between the secured portions, whereby the pull tab exerts two opposing forces upon that portion of the ridge seal axially in register with said intermediate unsecured portion when a user pulls upon the pull tab.

The pull tab for present use comprises a shank member having a proximal end by which a user can grip and pull the tab, and a distal portion by which the shank is secured to the container. The transverse dimension of the shank is enlarged at the distal portion of the shank so as to provide laterally extending foot members which are secured to the container. The intermediate area of the distal end of the shank may or may not be secured to the container. Typically, the foot members extend from 1 to 5 cms to either side of the shank of the pull tab and extend at any suitable angle from the shank to provide the required d:d' ratio for the securement areas by which the foot members are secured to the wall of the container. We have found that the included angle between the proximal edges of the foot members and the longitudinal edges of the shank member should be less than 90°, preferably from 15 to 80°, notably about 45°, so that the forces exerted on the foot members when the shank is pulled by a user do not act to peel the securement from the container wall. Such angles also permit the edges of the areas or lines of securement to adopt the desired orientation within the plan area of the foot members.

The longitudial edges of the shank may intersect the line of the proximal edge of each foot member at a sharp angle. However, it is preferred to provide a radiussed intersection extending over from 1 to 5 mms of the longitudinal length of the shank. Such radiussing provides a stop to any tearing of the material of the pull tab in this location and also allows the material of the pull tab to deform in this area during formation of the V folds of the gabled end of the container and also to reduce the lifting of the proximal edge of the foot members and thus reduce the peeling force acting on the securement of the foot members to the container wall. When determining the position of the point of rotation of the shank member, allowance needs to be made for such radiussing. In general we find that when designing the shape of the pull tab it is satisfactory to assess the point of rotation as being halfway between the longitudinal points along the axis of the shank member where the radiussing begins and ends. However, it will be appreciated that the point of rotation will move distally towards the end of the radiussing when the pull tab is lifted and pulled by a user so that the point of rotation has a rest position and an extreme in use position which is substantially in register with the distal end of the radiussing.

The term point of rotation of the shank member is therefore deemed to include both the rest and extreme in use positions. A particularly preferred form of pull tab is a generally T shaper planar member having a triangular finger ring at its proximal end joined by a shank member to a pair of generally triangular shaped foot members which extend longitudinally for substantially the same distance to either side of the point at which the feet join the shank member. The opposing edges of the finger ring and the foot members are substantially parallel to one another and are inclined at substantially 45° to the longitudinal axis of the shank member.

It is also preferred to provide the proximal portion of the pull tab with a finger hole, ribbing or other means by which a user can grip the pull tab. Such forms of pull tab can be made using conventional cutting, stamping or other equipment and techniques.

The pull tab can be made from a number of materials, depending upon the method used to secure the foot members to the container wall. Preferably, the pull tab is secured by heat or ultra sonic welding and the pull tab is made from a material which readily welds to the container wall. Thus the pull tab can be cut from a sheet of polyethylene or other low temperature fusing thermoplastic material. Where the pull tab is secured to the container wall be a hot melt adhesive, a pressure sensitive adhesive or double sided adhesive tape, it may be desired to subject the polyethylene to corona discharge or other treatment to render it receptive to the adhesive. However, we have found that polyethylene may not have the tensile strength required to apply sufficient force to the seal of the container without itself tearing. A particularly preferred material is a laminated material having one exposed face formed from a polyethylene which can be thermally bonded to the material of the container wall, and one or more plies of a high tensile material, for example a polyester. It is particularly preferred that the other exposed face of the laminate is formed from a material which has a fusion point higher than, preferably at least 40° C. higher than, the fusion point of the surface layer of the container wall so that this face does not significantly fuse during the formation of the ridge seal to the container. Polyester, which has a fusion temperature about 100° C. higher than that of polyethylene, is particularly preferred. The use of such a laminate material reduces the risk of the exposed faces of the pull tab bonding to one another and/or to the container wall during the heat sealing of the ridge seal The pull tab can be secured to the container at any position on a wall of the container or within the ridge structure at which the secured portions of the pull tab can exert the separating force on a portion of the ridge seal axially in register with the pull tab. However, in order that the forces generated as the shank of the pull tab is pulled by a user can exert sufficient force on the ridge seal, it is preferred to secure the pull tab within 2.5 cms of the foot of the ridge seal. Thus, the pull tab can be secured to a tented side wall of the end of the sealed container or to the exposed side wall of the linear ridge seal. However, it is particularly preferred to secure the pull tab to a gabled end wall of the container so that the container is opened in a manner similar to a conventional carton. For convenience, the invention will be described hereinafter in terms of this preferred position of securement.

The distal end of the pull tab may be incorporated within the ridge structure. Since the distal portions of the pull tab are attached to opposing dry wall faces of this portion of the ridge seal, they do not impair the integrity of seal between the opposing wet walls of the ridge seal. However, securing the pull tab within the ridge structure may result in excessive creasing of that part of the distal end of the pull tab within the V fold of the ridge seal. This may require the provision of abhesive or other means to prevent significant adhesion of that intermediate portion of the pull tab to the opposing portions of the ridge structure during heat sealing of the ridge structure during closing of the container after filling. It is therefore preferred that the laterally extending feet of the pull tab be secured to one or more of the portions of the gabled end wall of the container below the ridge seal itself. The securement can be to the central triangular portion of the gabled end wall. However, this may require that the securement be axially removed some distance from the foot of the ridge seal and thus that the forces generated by the pull tab do not act directly upon the ridge seal and their effect on the ridge seal is reduced. It is therefore particularly preferred that the pull tab be secured to the side roof triangle walls of the gabled end wall and, preferably, not to the central triangular end wall of the gabled end wall. By securing the pull tab in this manner, once the end of the linear ridge seal had been separated as described above for the initial stage of opening the carton to form a T or Y plan view seal, the forces applied by the pull tab to the ridge seal exert a peeling action on the ridge at the intersection of the upright and head of the Y or T which causes the ridge seal to separate readily at this point. A force is also generated transverse to the line of the ridge seal, bowing the gable end wall outwardly to form the outlet spout to the container and progressively separating the ridge seal to either side of the intersection. As a result, a pull tab anchored in this manner is surprisingly more resistant to detachment from the container wall than one anchored to the central triangle wall or within the ridge seal structure as with the prior art proposals.

Accordingly, from another aspect, the present invention provides a boxed end container of the invention, characterised in that the foot members of the pull tab are secured to the gabled end triangular roof portions of the gabled end of the container. Preferably the portion of the distal end of the shank member intermediate the foot members is not secured to the container wall.

The container may be made from a wide range of materials, for example wax coated card, polymer coated card or a laminated plastic sheet material. However, the invention will be described hereinafter in terms of a conventional gable ended container made from a polyethylene or other thermoplastic polymer laminated card. Such containers can be made by folding and securing the appropriate opposing edges of a flat blank using conventional techniques and equipment. Whilst the pull tab can be applied at any suitable point during the manufacture of the container or its blank or during the filling and sealing of the assembled container, it is preferred to secure the pull tab to the blank prior to assembly of the container using a conventional heat sealing technique.

The invention thus also provides a blank for use in the construction of a boxed end openable container of the invention, which blank comprises a series of connected panels adapted to be folded and secured to one another so as to form the container, the terminal portions of two of said panels being adapted to form the gable end walls of the assembled container, characterised in that at or adjacent the terminal portion of one or more wall panels there is secured a pull tab comprising a generally planar member having a proximal end adapted to be grasped and pulled by a user, an axially extending shank member and a distal end portion having foot members extending transversely to each side thereof by which the pull tab is secured to a panel of the blank by means of securement means, characterised in that the securement means presents an edge proximal edge to the point of rotation of the shank member and configured so that at least a portion of the edge extends normal to a line extending from the point of rotation to intersect the edge intermediate the ends thereof.

Preferably, each of said terminal portions of said two panels are to form the gable end walls of the container and is provided with substantially symmetrical fold lines forming a V having its apex at or adjacent the centre point of the terminal edge of the panel and its base at or adjacent the intended base of the gable end wall so as to define two laterally outward triangular areas and an intermediate triangular area of said terminal portion; and the foot members of the pull tab are secured to each of the laterally outward triangular portions of at least one of said terminal portions.

Preferably, the pull tab is located axially symmetrically about the centre line of the panel and substantially in register with that portion of terminal portion of the panel which is to form the apex of the V fold in the gable end of the assembled container.

The pull tab can be applied to the container blank using any suitable technique, for example a rotary or linear label application technique using a tack weld, adhesive or other means to secure the pull tab in position initially; and thereafter apply a subsequent full heat weld to secure the pull tab in position. However, it will usually be desired to secure the pull tab in position with a single full heat weld in a single pass through the pull tab application and securing process.

For convenience, the securement of the pull tab to the container will be described in terms of the heat welding of the foot members of the pull tab to the appropriate areas of the blank from which the container is subsequently manufactured. The heat welding is conveniently achieved by a conventional heat sealing technique.

As stated above, the heat weld can extend over the plan area of the foot member, but preferably is in the form of one or more line welds between the foot member and the wall material of the container. The ability to use line welds to secure the foot members to the container wall reduces the risk of thermal damage to the pull tab and enables the pressure required for the heat welding to be applied over small areas, thus reducing the power requirements for the heat welder. Such line welds can be simple continuous or discontinuous straight lines or can form a rectangle or other shape enclosing an unwelded area. The welds may also follow curved lines and a particularly preferred form of weld line is an arc centred upon the point of rotation of the shank of the pull tab so that all forces generated by pulling the proximal end of the pull tab are applied substantially normally to the line of the weld. If desired, several line welds may be formed at progressively increasing distances from the point of rotation.

As indicated above, the welded areas preferably extend longitudinally both above (that is proximally of) and below (that is distally of) the point of rotation of the shank of the pull tab. Preferably, at least one welded area to each side of longitudinal axis of the shank of the pull tab extends continuously from above to below the point of rotation and has an edge proximal to the point of rotation which subtends over at least a portion of its length an included angle to the longitudinal axis of the shank which is from 20 to 80°, preferably about 45°. It is particularly preferred that the edges of the lines or areas of securement are adjacent to and substantially parallel to the fold lines defining the boundaries between the three triangular portions of the gabled end of the container so that the forces applied by the pull tab act directly to The optimum form of the securement can readily be determined within the above guidelines using simple trial and error tests.

In order to assist separation of the ridge seal, it may be preferred to provide reduced adhesion between the opposed faces of the dry walls for at least a portion, typically from 10 to 50%, of the indentation of the v folds within the ridge seal. This can be achieved by applying an abhesive agent to selected areas of the opposing dry walls which are to be incorporated into the ridge seal. Alternatively, such weakness in the ridge seal can be achieved by extending part or all of the distal end of the shank and/or of the lateral foot members into the ridge structure. However, we have found that the location of the anchorage of the pull tab to the gable end triangular roof faces usually enables sufficient separating force to be applied to the ridge seal without the need for any abhesion or other weakening of the ridge seal, thus reducing the risk of premature separation of the seal and failure of the container.

The above preferred form of container is readily opened by partially separating one end of the linear ridge seal formed by the conventional heat seal closure of the container and then applying tension to the proximal end of the pull tab.

Accordingly, the invention also provides a method for opening a boxed end openable container of the invention, which method comprises separating the seal between the dry walls at that end of the ridge seal of the container adjacent the pull tab, or deflecting the ends of the ridge seal, so as to form a ridge seal having bowed or a T or Y configuration, and applying tension to the proximal end of the pull tab so as to separate the seal between the wet walls of seal, preferably at the intersection of the upright and head of the T or Y configured seal.

We believe that, at least initially, the force applied to the wet walls of the ridge seal by the pull tab is a peel force acting along the line of the ridge seal at this point. However, the force will usually also include a component normal to the line of the seal which acts at least in part upwardly towards the lower edge of the ridge seal and acts to impart an upward peeling force upon the ridge seal which further aids separation of the ridge seal. Continued application of tension to the pull tab causes progressive separation of substantially the whole length of the seal to form a spout outlet to the container. If desired, the container may be provided with one or more score or fold lines which assist the bowing of the gable end walls and the associated side wall of the container to assist separation of the ridge seal and deployment of the spout outlet to the container. Such fold or score lines can be formed using conventional techniques and equipment.

The surfaces of the spout which are contacted by the discharging contents of the container, are those of the wet walls which have been bonded together during sealing of the container and have not been exposed to external contamination during storage and transport prior to opening of the container. Furthermore, since the pull tab is secured externally to the container and does not form part of the lip of the spout, material flowing through the spout will not contact the pull tab and will not thus be contaminated by grease, dirt etc on the pull tab. The containers of the invention can therefore be used for the packaging of foodstuffs and other materials which require to be held under sterile conditions and which must be subjected to the minimum of contamination during discharge from the container. Furthermore, since the container and the pull tab can be made without any metallic components, the containers of the invention can be heated in a microwave oven. The containers of the invention can thus be used to contain soups or other. foodstuffs which require heating before consumption. Since the containers can be readily and simply opened, risk of spillage of hot foodstuff onto a user is reduced.

The invention thus provides a simple and effective solution to the problem of opening a boxed end openable container without the need to modify the container manufacturing or filling process significantly, thus enabling the invention to be applied to conventional equipment. Alternatively, the pull tab can be applied to an assembled or sealed container using any suitable machine located at the end of the container assembly, sealing or filling line.

DESCRIPTION OF THE DRAWINGS

To aid understanding of the invention, a preferred form thereof will now be described by way of illustration and with respect to the accompanying drawings, in which.

DESCRIPTION OF THE PREFERRED EMBODIMENT

The container comprises a generally rectangular or square main body portion 1, whose bottom has been closed by conventional box folds or other means, and which contains milk, fruit juice or other fluid or a fluent powder. The container is made from a wax or plastic coated paper or card so that it can readily be folded along score lines or the like formed in a sheet blank from which the container is made and the folded configuration secured in place by heat sealing or otherwise adhering the overlapping edge portions of the assembled container. Alternatively, the container can be made by blow or extrusion moulding a suitable plastic so that the container is formed as a unitary article with an open top.

Where the container is made from a flat blank, this is folded and secured in its desired erected form by heat welding, adhesive or other securing techniques. For convenience, the invention will be described hereinafter in terms of the use of a polyethylene or other thermoplastic polymer coated card as is conventionally used in the manufacture of such containers.

The upper, terminal portions of the side walls of the container have been folded in upon one another to form a conventional boxed end. In such an operation a V fold is formed in each of two opposed side walls with the apex of each V directed towards the centre line of the container. This has the effect of bringing the top edges of the other two side walls together to form a tented end to the container. The top edges of the side walls lie against one another to form a ridge 2 lying along a transverse line extending along the line of indentation of the V folds. The edges are sealed together by applying heat and pressure using a conventional heat sealing bar or the like to form a comparatively deep transverse seal closure along the ridge 2. The depth of this ridge seal is sufficient to incorporate the upper edges of the V folded walls to ensure a fluid tight closure.

Figure 2:
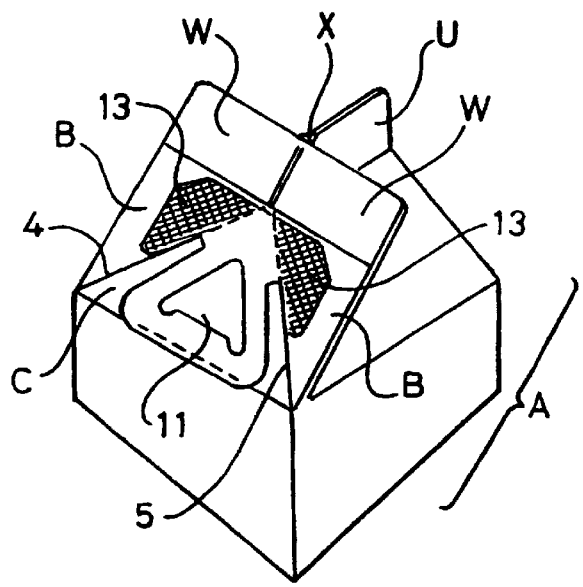
FIGS. 2, 3 and 4 shows the container of FIG. 1 with the ridge seal partially opened, bent back to form the inverted Y configuration and with the ridge seal separated to form a spout outlet to the container.

The indented portion of the end of the container is the gabled end 3 and carries a pull tab 10. As shown in FIG. 2, the gabled end wall A carries two fold lines 4 and 5 forming a triangle with its apex at the point at which the wall A is folded to form the V fold as the gabled end to the container is formed. To each side of these lines lie inverted triangular areas B which are to form the roof faces of the gabled end of the assembled container and have their bases along the foot of the upper terminal portion of wall A which is to be incorporated into the ridge seal 2. Between these triangular areas B is another reversed triangular area C. These areas can readily be seen in the blanks shown in FIGS. 5 and 6.

A pull tab cut from a polyethylene/polyester laminate has a pull ring 11 at the proximal end of a shank portion 12.

Extending laterally from the shank portion are two symmetrical triangular feet 13. These are secured via the polyethylene layer to the triangular areas B to either side of area C by heat welding or other means, for example adhesive or riveting. The securing extends over the shaded areas shown in the drawings and it will be noted does not extend into the intermediate portion D of the shank between the feet 13. The central portion of the pull tab formed from shank 12 and ring pull 11 is not secured to the wall of the container, but is free to bow away from the container during formation of the gabled end to the container and during sealing of the ridge seal. If desired, the proximal end of the ring pull 11 may be tack welded or otherwise temporarily secured to the wall of the container for transport and storage prior to use.

Figure 7:
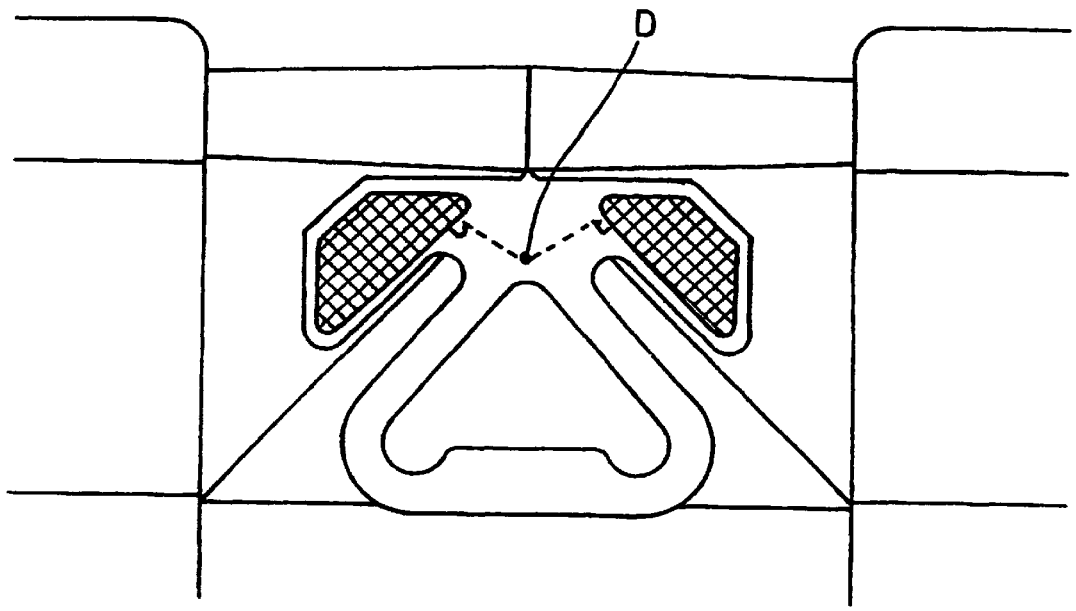
FIG. 7 shows the relationship of the edge of the heat sealed area securing the feet of the pull tab to the container wall to the point of rotation of the shank member.

As shown in FIG. 7, the shank 12 flexes about a point D when the ring pull 11 is pulled. This point D is the point of rotation. The edge of the heat seals between the feet 13 and the walls B proximal to the point of rotation D is located closely adjacent to and substantially parallel to the fold lines 4 and 5 so that the included angle between the edge of the heat seal and the longitudinal axis of the shank of the pull tab is about 45°. A line drawn from the point of rotation D normal to the edge of the heat seal intersects the edge between its ends and the seal acts as a stop to prevent peeling of the heat seal. The heat seal area extends both distally beyond and proximally short of the point of rotation and the ratio of d:d' has a value of approximately 1:1.

Figure 5:
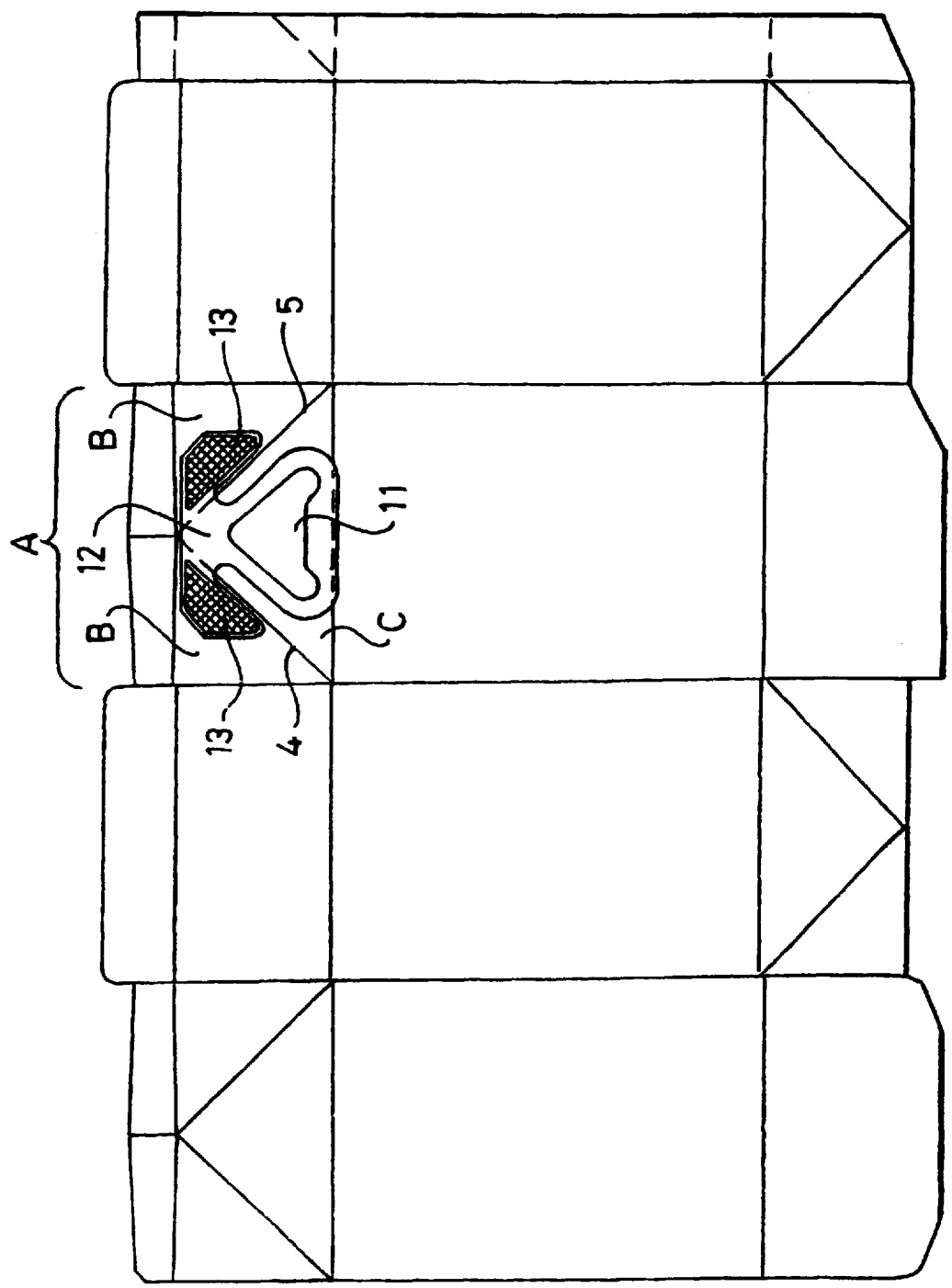
FIG. 5 shows a plan view of a blank for use in the construction of the container of FIG. 1.
Figure 6:
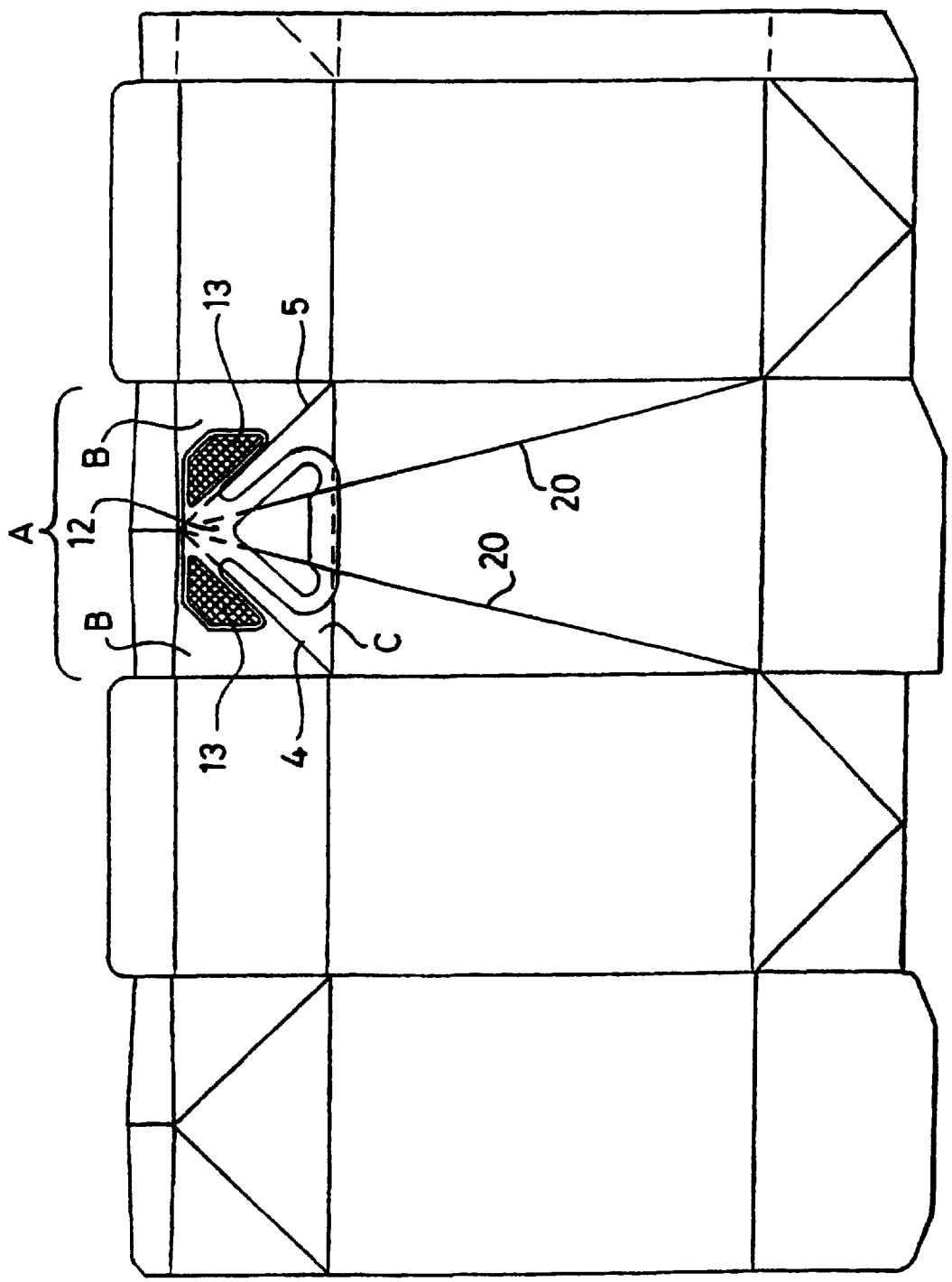
FIG. 6 shows an alternative version of the blank having additional fold lines to assist forming a full length spout to the side wall of the container.

Such a container can be assembled from a blank as shown in FIG. 5 using conventional techniques and equipment.

Figure 3:
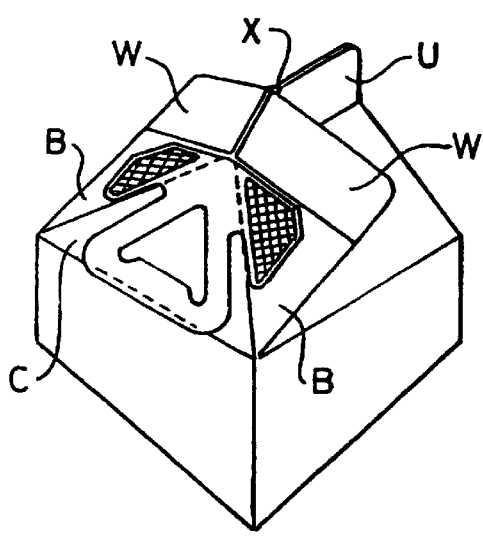

In use, the seal between opposed dry walls along ridge 2 is separated at that end adjacent the pull tab 10 as with a conventional container to produce a ridge which has a T plan shape as shown in FIG. 2, having an upright U and wings W to the head of the T shape. The seal between the opposed wet walls of the wings is still intact and so the container remains sealed. If desired, the ridge in the head of the T is bent backwards as shown in FIG. 3 to form an inverted Y plan shape to the ridge. The user then pulls upon the ring 11 to cause the ridge seal at the intersection X of the upright U and the wings W to separate and form the pouring spout 15. The pull tab 10 remains below the lip of the spout and is not in contact with the content of the container, thus reducing the risk of contamination of the content as they are discharged.

Figure 4:
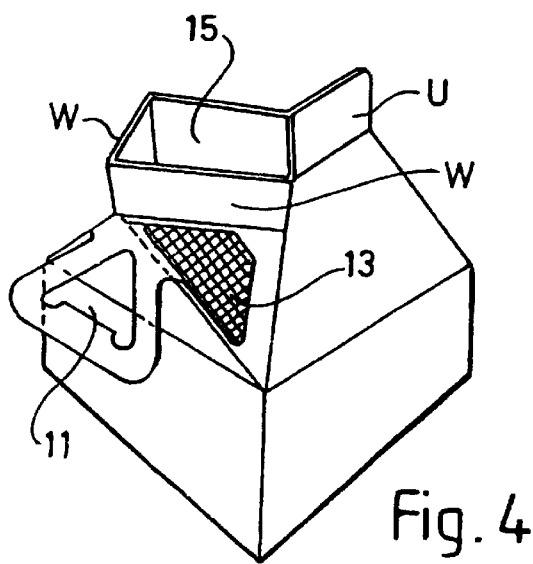

As shown in FIG. 4, the spout 15 is comparatively short. It may therefore be desired to add the additional fold lines 20 shown in FIG. 6 which extend from the apex of area C to the base of the container to permit the side wall of the container to bow outwards to form a spout extending for the full height of the container, thus aiding smooth flow of material from the container.

Due to the location and orientation of the heat seals, the feet 13 do not readily separate from the wall material and the user can thus exert considerable force on the ridge seal without the feet detaching from the wall. By way of contrast, when the pull tab was in the form of a T so that the heat seals securing the head of the T to the container wall did not extend proximaly of the point of rotation D, the pull tab readily peeled off the wall before the ridge seal was separated.

Figure 1:
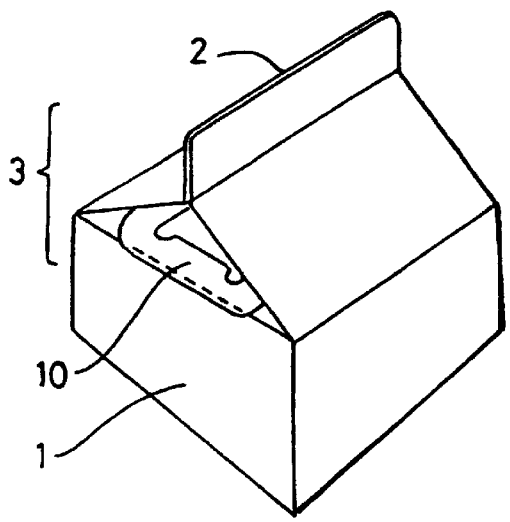
FIG. 1 is a perspective view of the boxed end openable container in the fully closed configuration carrying a pull tab.
Figure 8:
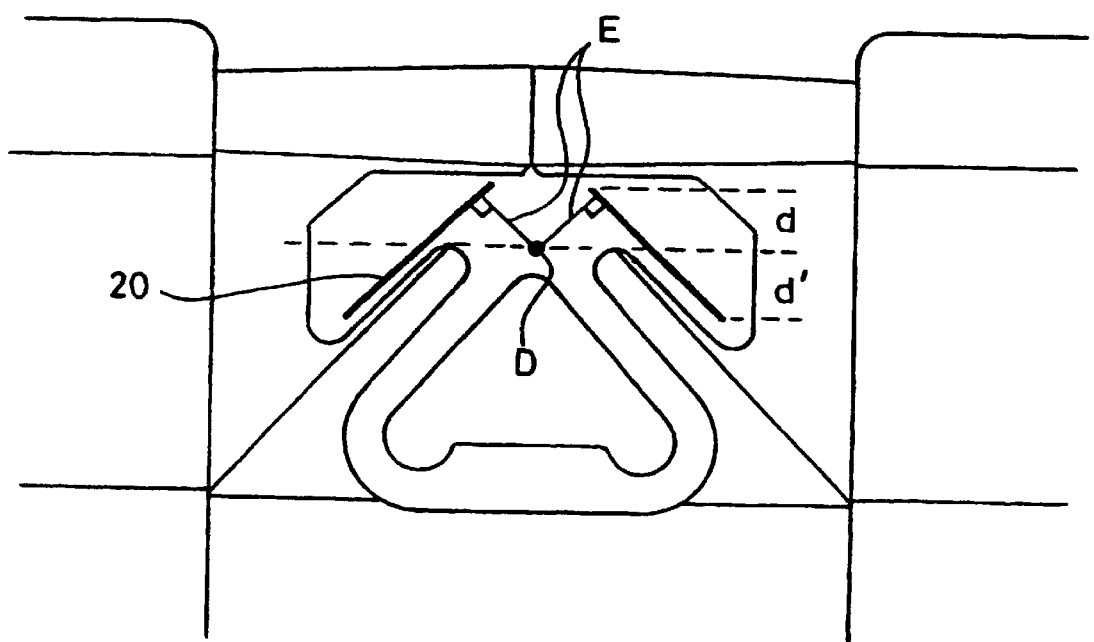
FIGS. 8 to 10 show alternative forms of line seals for use in the present invention.
Figure 9:
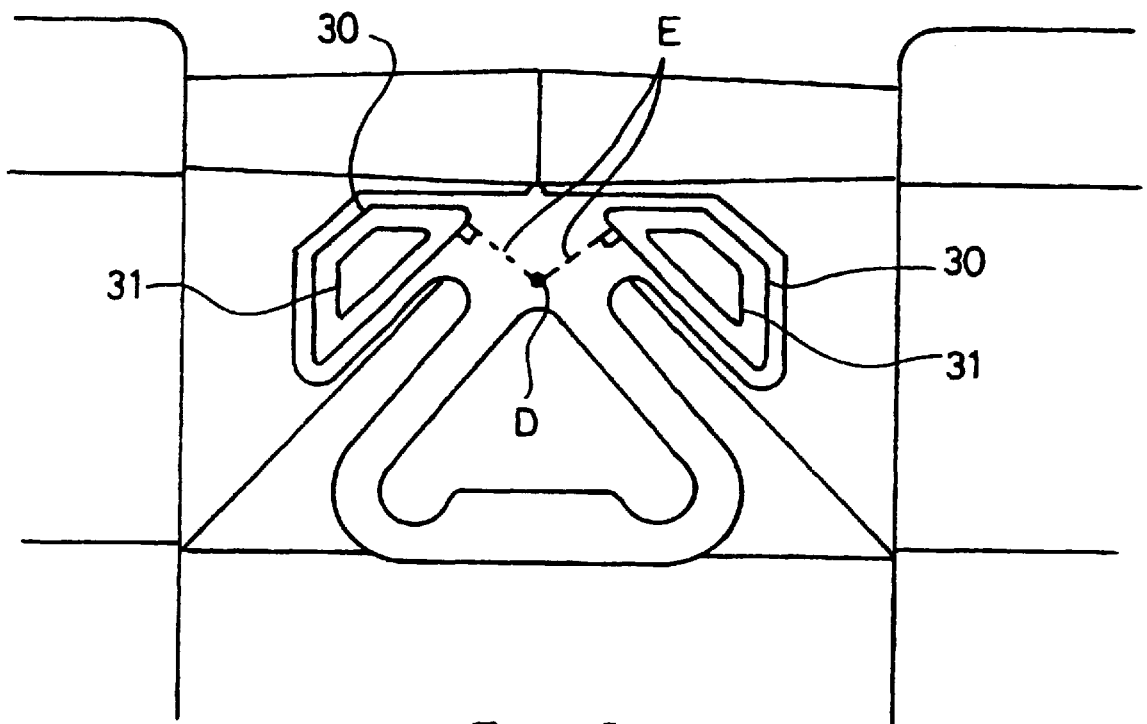
Figure 10:
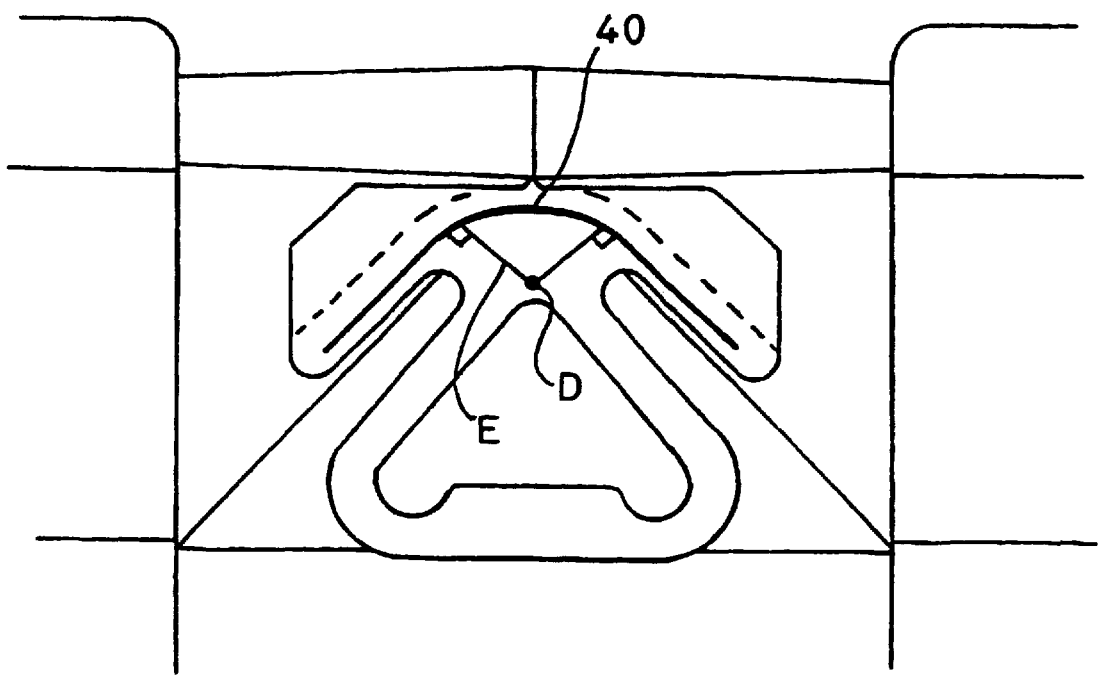

As shown in FIG. 8, the feet 13 are secured to the wall by line seals 20 and the lines E from the point of rotation normal to the line of the heat seals intersect the line seal intermediate their ends. Such a form of attachment ensures that the pull tab remains secured to the container wall whilst the ridge seal is separated. FIG. 9 shows a set of line seals 30 and 31 conforming to the shape of the outline of the solid heat seal used in FIG. 1; FIG. 10 shows an arcuate line heat seal 40. Also shown dotted in FIG. 10 is a form of the feet 13 which have been cut away to conform to the arcuate shape of the heat seal 40. All these variations of the heat seal of FIG. 8 provide good levels of attachment of the pull tab to the container wall.

What is claimed is:

1. A boxed end container having one end formed by in folding the terminal portions of two opposed side walls of the container to form a gabled end having gable end triangular walls and a transverse ridge structure at the upper end of the container and thus close the upper end of the container, the ridge structure being retained in the closed position by bonding together contacting surfaces of the wall material in the ridge structure to form a transverse ridge seal closure to the container, the container carrying a pull tab whereby a separating force can be applied to the ridge seal of the container so as to separate at least part of the bonding of the ridge seal and thus open the container to allow discharge of its contents, characterized in that:

the pull tab comprises a shank member extending longitudinally between a proximal end portion adapted to be gripped and pulled by a user and a distal end portion, said shank member having two longitudinally extending edges thereto;

said distal end portion of said shank member having foot members, at least one extending transversely to each side of the shank member, which are secured substantially symmetrically with respect to the longitudinal axis of said shank member externally to a wall of the container at or adjacent to the ridge structure of the container, said foot members having a proximal edge which extends from said longitudinal edge of said shank member, the shank member and the foot members in their free state when not secured to the container being substantially co-planar with one another;

the shank member has a point of rotation about which the shank member flexes with respect to the foot members when tension is applied to the proximal end of the shank member during opening of the container, said point of rotation being located longitudinally with respect to the shank member substantially in register with the junction of the longitudinal edges of the shank member and the proximal edges of the foot members;

the securement of each of the foot members to the container wall is by means of a securement means which presents a securement edge proximal to the point of rotation, said securement edge being configured so that at least a portion thereof extends normal to a line extending from said securement edge to said point of rotation, said line intersecting said securement edge intermediate the ends hereof.

2. A container as claimed in claim 1, characterized in that the securement of the foot members is by means of a heat seal.

3. A container as claimed in claim 2, characterized in that the securement means is in the form of one or more line heat seals.

4. A boxed end container as claimed in claim 1, characterized in that securement of the foot members of the pull tab is by means of at least two lines of securement, one to each side of the longitudinal axis of the shank of the pull tab.

5. A container as claimed in claim 1, characterized in that the securement of the foot members of the pull tab is by means of a securement area or areas, at least one lying to each side of the longitudinal axis of the shank member of the pull tab, the securement areas extending longitudinally with respect to the shank member both distally and proximally about the said point of rotation.

6. A container as claimed in claim 5, characterized in that the securement areas extend a distance d distally beyond the point of rotation and a distance d' proximally short of the point of rotation and the ratio of d:d' has a value of from 10:1 to 1:10.

7. A boxed end container having one end formed by in folding the terminal portions of two opposed side walls of the container to form a gabled end having gable end triangular walls and a transverse ridge structure at the upper end of the container and thus close the upper end of the container, the ridge structure being retained in the closed position by bonding together contacting surfaces of the wall material in the ridge structure to form a transverse ridge seal closure to the container, the container carrying a pull tab whereby a separating force can be applied to the ridge seal of the container so as to separate at least part of the bonding of the ridge seal and thus open the container to allow discharge of its contents, characterized in that:

the pull tab comprises a shank member extending longitudinally between a proximal end portion adapted to be grasped and pulled by a user and a distal end portion, said shank member having two longitudinally extending edges thereto;

said distal end portion of said shank member having foot members, at least one extending transversely to each side of the shank member, which are secured substantially symetrically with respect to the longitudinal axis of said shank member externally to a wall of the container at or adjacent to the ridge structure of the container, said foot members having a proximal edge which extends from said longitudinal edge of said shank member, the shank member and the foot members in their free state when not secured to the container being substantially co-planar with one another;

the shank member has a point of rotation about which the shank member flexes with respect to the foot members when tension is applied to the proximal end of the shank member during opening of the container, said point of rotation being located longitudinally with respect to the shank member substantially in register with the junction of the longitudinal edges of the shank member and the proximal edges of the foot members;

the securement of each of the foot members to the container is by means of a securement means which extends longitudinally a distance d distally beyond the point of rotation and a distance d' proximally short of the point of rotation and the ratio of d:d' has a value of from 10:1 to 1:10.

8. A container as claimed in claim 7, characterized in that the securement means is a heat seal.

9. A container as claimed in claim 7, characterized in that the securement means is in the form of one or more line heat seals.

10. A container as claimed in claim 1 or 7, characterized in that a portion of the shank member intermediate the foot members is not secured to the container wall.

11. A container as claimed in claim 1 or 7, characterized in that the foot members are secured to the gable end triangular walls of the gabled end of the container.

12. A container as claimed in claim 1 or claim 7, characterized in that the pull tab is made from a laminate of two polymeric materials, one having a fusion temperature at least 40° C. higher than the fusion point of the other.

13. A container as claimed in claim 1 or 7, characterized in that the pull tab is made from a laminate of polyester and polyethylene.

14. A container as claimed in claim 1 or 7, characterized in that the included angle between the said proximal edge of the foot member and the longitudinal axis of the shank member is from 15 to 80°.

15. A blank for use in the manufacture of a carton as claimed in claim 1, characterized in that the blank comprises a series of connected panels adapted to be folded and secured to one another so as to form the container, the terminal portions of two of said panels being adapted to form the gable end walls of the assembled container, characterised in that at or adjacent the terminal portion of one or more wall panels there is secured by securement means a pull tab, said pull tab being a generally planar member comprising:

a shank member extending longitudinally between a proximal end portion adapted to be grasped and pulled by a user and a distal end portion, said shank member having two longitudinally extending edges thereto;

said distal end portion of said shank member having foot members, at least one extending transversely to each side of the shank member, which foot members are secured substantially symmetrically with respect to the longitudinal axis of the shank member to said one or more wall panels, said foot members having a proximal edge which extends from said longitudinal edge of said shank member;

said shank member having a point of rotation about which the shank member is adapted to flex, said point of rotation being located longitudinally with respect to the shank member substantially in register with the junction of said longitudinal edges of the shank member and said proximal edges of said foot members;

and in that said securement means presents an edge proximal edge to the point of rotation of the shank member, said securement edge being configured so that at least a portion of thereof extends normal to a line extending from said point of rotation to intersect said securement edge intermediate the ends thereof.

16. A blank for use in the manufacture of a carton as claimed in claim 7, characterized in that the blank comprises a series of connected panels adapted to be folded and secured to one another so as to form the container, the terminal portions of two of said panels being adapted to form the gable end walls of the assembled container, characterised in that at or adjacent the terminal portion of one or more wall panels there is secured by securement means a pull tab, said pull tab being a generally planar member comprising:

a shank member extending longitudinally between a proximal end portion adapted to be grasped and pulled by a user and a distal end portion, said shank member having two longitudinally extending edges thereto;

said distal end portion of said shank member having foot members, at least one extending transversely to each side of the shank member, which foot members are secured substantially symmetrically with respect to the longitudinal axis of the shank member to said one or more wall panels, said foot members having a proximal edge which extends from said longitudinal edge of said shank member;

said shank member having a point of rotation about which the shank member is adapted to flex, said point of rotation being located longitudinally with respect to the shank member substantially in register with the junction of said longitudinal edges of the shank member and said proximal edges of said foot members;

and in that said securement means of each of the foot members extends longitudinally a distance d distally beyond the point of rotation and a distance d' proximally short of the point of rotation and the ratio of d:d' has a value of from 10:1 to 1:10.

17. A pull tab for use upon a container or blank as claimed in either of claim 1 or 7, characterized in that the pull tab is a generally planar member and comprises:

a shank member extending longitudinally between a proximal end portion adapted to be grasped and pulled by a user and a distal end portion, said shank member having two longitudinally extending edges thereto;

said distal end portion of said shank member having foot members, at least one extending transversely to each side of the shank member, which foot members are adapted to be secured substantially symmetrically with respect to the longitudinal axis of the shank member to said container or blank, said foot members having a proximal edge which extends from said longitudinal edge of said shank member;

said shank member having a point of rotation about which the shank member is adapted to flex, said point of rotation being located longitudinally with respect to the shank member substantially in register with the junction of said longitudinal edges of the shank member and said proximal edges of said foot members;

each of the said foot members extends longitudinally a distance d distally beyond the point of rotation and a distance d' proximally short of the point of rotation and the ratio of d:d' has a value of from 10:1 to 1:10.

18. A pull tab as claimed in claim 17, characterized in that the included angle between the proximal edge of the foot member and the longitudinal axis of the shank member is from 15 to 80°.

19. A pull tab as claimed in claim 17, characterized in that the pull tab is made from a laminate of two polymeric materials, one having a fusion temperature at least 40° C. higher than the fusion point of the other.

20. A pull tab as claimed in claim 19, characterized in that the pull tab is made from a laminate of polyester and polyethylene.

* * * * *